United States Patent Office 3,457,594
Patented July 29, 1969

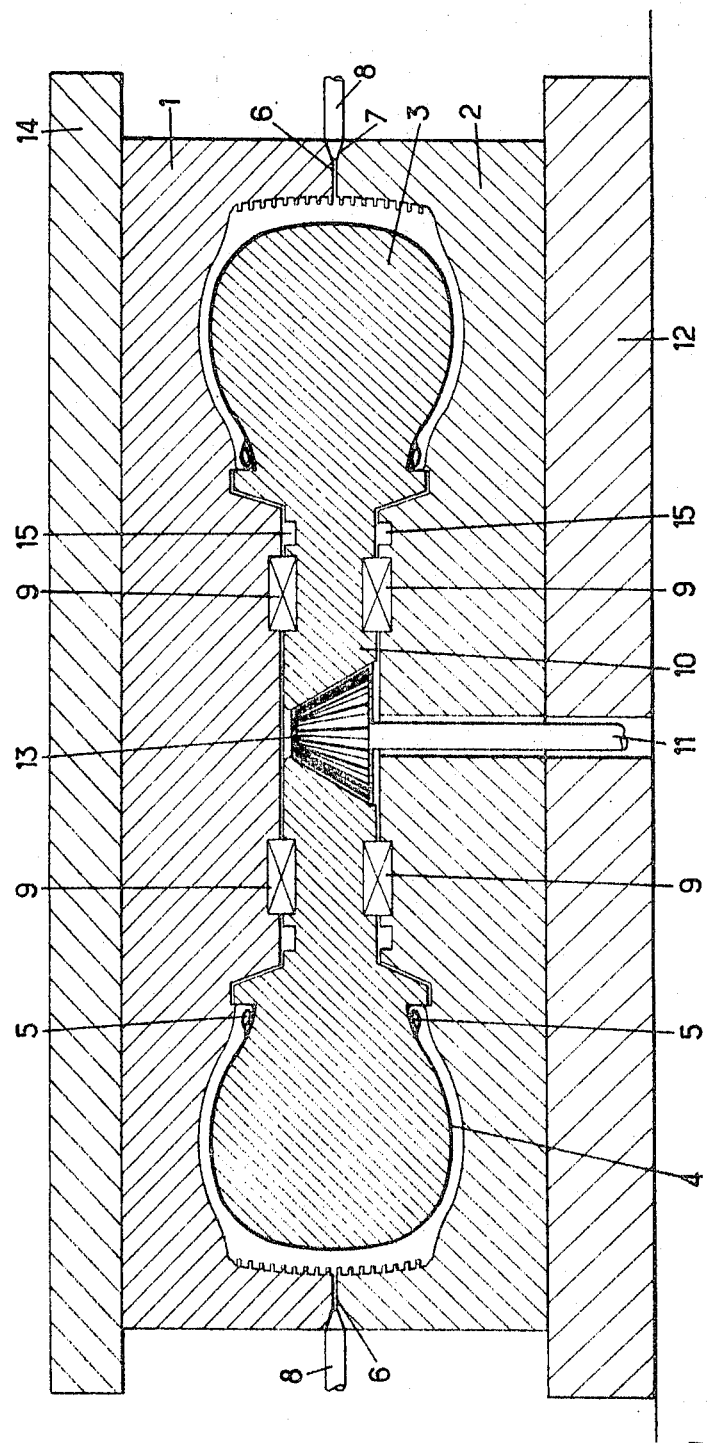

3,457,594
PROCESS AND APPARATUS FOR INJECTION MOULDING TIRES
Antoine Joseph Georges Baudou, Les Eglisottes, Gironde, France
Filed July 5, 1966, Ser. No. 562,851
Claims priority, application France, June 7, 1966, 64,549
Int. Cl. B29h 17/00, 5/02
U.S. Cl. 18—30                                    4 Claims

ABSTRACT OF THE DISCLOSURE

A method of producing injection moulded products which have increased peripheral strength which comprises causing relative rotation between the core and the separable outer parts of the mould about the axis of the annular recess for forming the product while a moulding material is introduced into said recess at points radially spaced from said axis.

A mould having two separable outer parts which form an annular recess for forming an article and a core part having means through which a moulding material can be introduced into said recess at points radially spaced from the axis of said recess and means for causing relative rotation between said core part and said outer parts about said axis in a plane perpendicular to said axis.

---

The technique of injection moulding, first used for moulding thermoplastic materials, and also for moulding thermosetting materials through the transfer process, has more recently been extended to vulcanizable elastomers such as rubber by using suitable injection pressures. This technique permits the lowering of the cost of many articles made of rubber or of polyvinyl chloride.

Nevertheless in the fabrication of vehicle tires it has never been possible to use this technique because of the annular form of the article. Actually, if material is injected at one end of a diameter of the tire the material advances in two streams around the core and these streams meet in the area diametrically opposed to the point of injection. Nevertheless, when this point is reached, the material is already partially vulcanized and the two streams bond poorly to each other, so that when the tire is used there is a risk that the casing will burst at the indicated point because of the pressure and centrifugal force to which it is subjected. It is possible to make the injection at a plurality of points around the circumference, which has the advantage of reducing the time of injection and therefore the degree of vulcanization of the various streams when they come together. On the other hand, the number of juncture points is also multiplied so that the resistance to bursting is not improved.

The object of the present invention is to provide a new article of manufacture consisting of a mould designed to carry out the peceding process and essentially characterized by the fact that it comprises two shells and has one or more injection holes on its periphery. The shells conform to the shape and exterior design of the tire, and the mould also comprises a retractable metallic core conforming to the inside shape of the tire and mounted between the two shells in such a way that it can rotate inside the closed mould, mechanical means being provided to drive it in rotation.

In order that the invention may be better understood, one embodiment thereof will now be described, purely by way of example, with reference to the accompanying drawing. The single figure shown on this drawing is an axial section through the mould.

The mould consists of two shells 1 and 2 which are joined together in the usual way so as to conform to the exterior shape of the tire casing. A core 3 is placed inside the shells and is removable or retractable to permit the textile carcass 4 and the metallic rods 5 to be mounted in the conventional manner and also to permit the mould to be removed at the end of the operation. One or more injection holes 6 are distributed around the periphery of the mould, each opening into a conical hole 7 suitable for attachment to an injection nozzle 8 of the usual type.

If the injection is simply made through one of the holes 6, the injected vulcanizable product flows in two streams around the sides of core 3, these two streams then coming together in the area diametrically opposed to the injection hole 6. During the entire injection time, which may be for example about twelve seconds, the product partially vulcanizes in the alreedy heated mould so that the bond between the two streams is poor and does not lead to a true bond capable of guaranteeing a sufficient resistance.

If several injection holes 6 are used, for example, four distributed around the axis, the injection times are correspondingly reduced, which reduces the degree of vulcanization of the various streams when they meet, but on the other hand there are then eight streams meeting two at a time in four areas which consequently increases the number of zones of weakened resistance.

To remedy this according to the invention, a core 3 is mounted in the mould on supporting means 9, which may comprise rollers or ball-bearings, placed in suitable races in the central portion 10 of core 3 and in shells 1 and 2, so as to permit the core to rotate around its axis inside the closed mould. It is driven in rotation by a shaft 11 extending through shell 2 and the lower plate 12 of the press and terminating in a head 13 in the form of a conical gear which meshes in a correspondingly tapered recess in the central portion 10.

To make the casting, a carcass 4 of the usual type is placed on core 3 after retracting the core, which is then returned to its original position. The core is then placed between the two shells 1 and 2 and the entire mould is placed between plates 12 and 14 of a press, which may be of the hydraulic type, and which exerts a greater force than that resulting from the application of the injection pressure to the interior of the moulded article.

The central portion 10 of core 3 is carefully fitted between shells 1 and 2 so that the play existing between these members, under normal working conditions of pressure and temperature, is sufficient to permit them to rotate relative to each other but insufficient to permit infiltration of the injected product. Grooves 15 may, however, be provided for the protection of rolls 9.

The mould being thus closed and locked by the press, core 3 is set in rotation by shaft 11, then the injection is made at one or more points. The material introduced into the mould is consequently drawn by the rotation of core 3 and fills progressively all of the inside space of mould all while rolling many times around core 3, which results in a true malaxation of the material.

The rotational movement of the core is halted at the end of the injection or either before or after the end of the injection and the rubber continues to vulcanize in the hot mould. If necessary the rubber mixture may be selected to insure that its vulcanization will begin only after the rotation of the core has been halted.

Once the vulcanization has stopped, the mould is opened and the tire is taken out in the conventional way. The moulding operation is consequently relatively rapid, especially if several injection points are used, and in all cases, whether there is one injection point or several, the material spreads out in a continuous layer around the core without any juncture zone of least resistance.

This process thus permits much cheaper manufacture of tires due to the great savings on manpower normally needed to cut and roll the layers of rubber around the carcass. Moreover, the tires obtained are of a quality and strength at least equal to those obtained by conventional methods.

It will, of course, be appreciated that the foregoing embodiment has been given purely by way of example and that the scope of the invention is not to be considered limited to the specific details of said embodiment.

The object of the present invention is to provide the new industrial product which consists of a mould in which to carry out the preceding process and essentially characterized by the fact that it comprises two shells having one or more injection holes in the periphery and conforming to the shape and exterior design of the tire, and a retractable metallic core conforming to the inner shape of the tire and mounted between the two shells so as to be able to rotate inside the closed mould, mechanical means being provided to drive it in rotation.

What is claimed is:

1. A heat vulcanizing mould apparatus comprising two separable outer parts and a core part, said parts defining, when assembled together, an annular recess for forming an article to be moulded therein, injection means to introduce a moulding material into said recess at at least one point radially spaced from the axis of said recess, and means for causing relative rotation between said core part and said outer parts about said axis in a plane perpendicular to said axis.

2. A mould apparatus as claimed in claim 1 in which said rotation causing means is connected to drive said core part.

3. A mould apparatus as claimed in claim 1 in which said core part is independently removable when said outer parts are separated.

4. A mould apparatus as claimed in claim 1 in which said recess is shaped to mould a vehicular tire.

References Cited

UNITED STATES PATENTS

| | | | |
|---|---|---|---|
| 1,417,739 | 3/1922 | Hopkinson | 18—17 |
| 1,513,102 | 10/1924 | Gammeter | 18—42 |
| 1,652,020 | 12/1927 | Laursen | 18—42 |
| 2,744,290 | 5/1956 | Corson | 18—30 |
| 2,855,629 | 19/1958 | Barefoot | 18—18 |
| 3,371,387 | 3/1968 | Cleereman et al. | 18—42 |

J. HOWARD FLINT, JR, Primary Examiner

U.S. Cl. X.R.

18—5, 42